(12) United States Patent
Lutz et al.

(10) Patent No.: US 9,292,298 B2
(45) Date of Patent: Mar. 22, 2016

(54) DATA PROCESSING APPARATUS HAVING SIMD PROCESSING CIRCUITRY

(71) Applicant: ARM LIMITED, Cambridge (GB)

(72) Inventors: David Raymond Lutz, Austin, TX (US); Neil Burgess, Austin, TX (US)

(73) Assignee: ARM Limited, Cambridge (GB)

( * ) Notice: Subject to any disclaimer, the term of this patent is extended or adjusted under 35 U.S.C. 154(b) by 438 days.

(21) Appl. No.: 13/936,576

(22) Filed: Jul. 8, 2013

(65) Prior Publication Data

US 2015/0012724 A1  Jan. 8, 2015

(51) Int. Cl.
G06F 7/38 (2006.01)
G06F 15/00 (2006.01)
G06F 9/38 (2006.01)

(52) U.S. Cl.
CPC .................................... *G06F 9/3887* (2013.01)

(58) Field of Classification Search
CPC ............ G06F 9/30036; G06F 9/30032; G06F 9/3885; H04N 19/44
See application file for complete search history.

(56) References Cited

U.S. PATENT DOCUMENTS

| | | | |
|---|---|---|---|
| 4,785,393 A | 11/1988 | Chu et al. | |
| 6,223,320 B1 | 4/2001 | Dubey et al. | |
| 6,338,136 B1 | 1/2002 | Col et al. | |
| 6,718,504 B1* | 4/2004 | Coombs ............ | H03M 13/2957 712/E9.017 |
| 2002/0026570 A1* | 2/2002 | Shimizu .............. | G06F 9/30025 712/225 |
| 2004/0006681 A1 | 1/2004 | Moreno et al. | |
| 2004/0249878 A1 | 12/2004 | Luick | |
| 2006/0015703 A1 | 1/2006 | Ramchandran et al. | |
| 2007/0185953 A1 | 8/2007 | Prokopenko et al. | |
| 2009/0172366 A1* | 7/2009 | Anderson ........... | G06F 9/30032 712/225 |
| 2010/0095087 A1 | 4/2010 | Eichenberger et al. | |
| 2010/0095098 A1 | 4/2010 | Gschwind | |
| 2013/0275727 A1* | 10/2013 | Abraham .............. | G06F 9/3001 712/221 |
| 2014/0013082 A1* | 1/2014 | Agarwal ............. | G06F 9/30032 712/204 |
| 2015/0043729 A1* | 2/2015 | Gopal ................... | H04L 9/0625 380/29 |

FOREIGN PATENT DOCUMENTS

EP  0 067 667  12/1982

* cited by examiner

*Primary Examiner* — Hyun Nam
(74) *Attorney, Agent, or Firm* — Nixon & Vanderhye P.C.

(57) ABSTRACT

A data processing apparatus has permutation circuitry for performing a permutation operation for changing a data element size or data element positioning of at least one source operand to generate first and second SIMD operands, and SIMD processing circuitry for performing a SIMD operation on the first and second SIMD operands. In response to a first SIMD instruction requiring a permutation operation, the instruction decoder controls the permutation circuitry to perform the permutation operation to generate the first and second SIMD operands and then controls the SIMD processing circuitry to perform the SIMD operation using these operands. In response to a second SIMD instruction not requiring a permutation operation, the instruction decoder controls the SIMD processing circuitry to perform the SIMD operation using the first and second SIMD operands identified by the instruction, without passing them via the permutation circuitry.

23 Claims, 7 Drawing Sheets

| cycle | permute instruction /54 | SIMD instruction /52 (no permute required) | SIMD instruction /50 (permute required) |
| --- | --- | --- | --- |
| 0 | permute A & B to generate op1/op2 | apply SIMD to op1/op2 to generate res | permute A & B to generate op1/op2 |
| 1 | | | apply SIMD to op1/op2 to generate res |

FIG. 9

DATA PROCESSING APPARATUS HAVING SIMD PROCESSING CIRCUITRY

BACKGROUND TO THE INVENTION

1. Field of the Invention

The present invention relates to the field of data processing. More particularly, the invention relates to a data processing apparatus having single instruction multiple data (SIMD) processing circuitry.

2. Background

A data processing apparatus may have SIMD processing circuitry for performing a SIMD operation on first and second operands comprising multiple data elements. The SIMD processing circuitry has several parallel lanes of processing which each perform a particular operation on corresponding data elements of the first and second operands. For example, the first and second operands may each comprise 32-bit data values, with each operand including four 8-bit data elements. A SIMD addition operation may perform four 8-bit additions in parallel on each pair of 8-bit data elements.

Sometimes, the order in which the data elements appear within the operands may not be the same as the order in which the data elements are to be combined by the SIMD operation, and so it may be necessary to perform some rearrangement of data elements prior to performing the SIMD operation. The present technique seeks to improve the implementation of such rearrangements to improve the performance of SIMD processing operations.

SUMMARY OF THE INVENTION

Viewed from one aspect, the present invention provides a data processing apparatus comprising:

single instruction multiple data (SIMD) processing circuitry configured to perform a SIMD operation on first and second SIMD operands comprising a plurality of data elements, the SIMD processing circuitry having a plurality of parallel processing lanes for processing corresponding data elements of the first and second SIMD operands;

permutation circuitry configured to perform a permutation operation on at least one source operand comprising a plurality of source data elements to generate said first and second SIMD operands, said permutation operation generating at least one of said first and second SIMD operands with at least one of a different data element size and a different data element positioning to said at least one source operand; and an instruction decoder configured to decode SIMD instructions requiring the SIMD operation to be performed by the SIMD processing circuitry;

wherein in response to a first SIMD instruction requiring the permutation operation and identifying the at least one source operand, the instruction decoder is configured to control the permutation circuitry to perform the permutation operation on the at least one source operand to generate the first and second SIMD operands, and to control the SIMD processing circuitry to perform the SIMD operation using the first and second SIMD operands generated by the permutation circuitry; and in response to a second SIMD instruction not requiring the permutation operation and identifying the first and second SIMD operands, the instruction decoder is configured to control the SIMD processing circuitry to perform the SIMD operation using the first and second SIMD operands identified by the second SIMD instruction, without passing the first and second SIMD operands via the permutation circuitry.

Existing SIMD processing units typically have an initial stage for performing a rearrangement operation on two input operands to generate SIMD operands with a different data element ordering compared to the input operands, so that a subsequent processing stage can then perform a SIMD operation on the rearranged operand. Even if a rearrangement is not required, the input operands would still be passed through the rearrangement stage without changing the positions of the data elements. However, this typically means that two processing cycles are required for performing all SIMD operations, one for performing the rearrangement and another for performing the SIMD operation itself. The first cycle is largely dedicated to multiplexing the data elements of the input operands so that they are aligned correctly for the SIMD operation in a second or further processing cycle. However, the inventors of the present technique realized that this alignment cycle is unnecessary for many SIMD instructions. Nevertheless, in conventional apparatuses all SIMD instructions pay the penalty for the element rearrangement. Therefore, most existing SIMD operations require more cycles to execute than they need to.

In contrast, the present technique provides separate permutation circuitry for performing a permutation operation for changing a data element ordering and/or data element size of the data elements, and SIMD processing circuitry for performing the SIMD operation. The permutation circuitry and SIMD processing circuitry can be controlled independently by an instruction decoder so that a first SIMD instruction which requires both permutation and a SIMD operation is executed using the permutation circuitry and the SIMD processing circuitry, while a second SIMD instruction which does not require any permutation is performed using the SIMD processing circuitry alone, without passing its first and second SIMD operands via the permutation circuitry. Hence, the second SIMD instruction is not penalized by the permutation required by the first SIMD instruction. In practice, most SIMD operations do not require permutation and so on many occasions the present technique enables a performance improvement. Often, the second SIMD instruction can be performed during a single processing cycle. That is, in contrast to previous implementations in which the permutation operation and the SIMD operation together correspond to a single micro-operation which cannot be split up, in the present technique the permutation operation may be isolated from the SIMD operation to provide two separate micro-operations which can be scheduled independently.

This technique is counterintuitive because one would expect that the permutation operation would only be required when a subsequent SIMD operation is to be performed and so therefore it is not apparent that providing the permutation operation as an independent micro-operation would be useful. As the SIMD operation would generally follow the permutation operation, existing systems combined the permutation operation and the SIMD operation into a single multi cycle operation. However, the inventors of the present invention recognized that in fact the SIMD operation will often be needed on its own, without the permutation operation. If the permutation and SIMD operations are combined in a single operation, the requirement to occasionally perform a permutation operation before a SIMD operation penalizes all SIMD operations, which is unnecessary. By isolating the permutation operation from the SIMD operation, the second SIMD instruction can be performed in fewer processing cycles than the first SIMD instruction to reduce the average number of cycles taken to process SIMD instructions.

An instruction decoder may control whether a particular SIMD instruction is performed using both the permutation circuitry and the SIMD processing circuitry or using the SIMD processing circuitry alone. For example, the first and second SIMD instructions may have different opcodes, allowing the instruction decoder to distinguish which instruction requires a permutation operation. Alternatively, the first and second SIMD instructions may have the same opcode but may have a field specifying whether a permutation is required, and what type of permutation.

The instruction decoder may be implemented in various ways. The instruction decoder may be a SIMD-only decoder which is solely for decoding SIMD instructions, with another instruction decoder provided for decoding other kinds of instructions. Alternatively, a single instruction decoder may decode both SIMD instructions and non-SIMD instructions. The instruction decoder may control the permutation circuitry and SIMD processing circuitry directly with signals sent from the instruction decoder to the permutation circuitry or SIMD processing circuitry, or the instruction decoder may indirectly control the permutation circuitry or SIMD processing circuitry by including indications in the decoded instructions which control other circuitry (e.g. an issue stage of a pipeline) to determine whether the permutation circuitry should be used for a particular SIMD instruction.

To allow SIMD instructions which do not require a permutation to be performed as quickly as possible, the SIMD processing circuitry may keep all its processing operations strictly within the same SIMD processing lane. Hence, the SIMD processing circuitry may not support the permutation operation. Each of the parallel processing lanes of the SIMD processing circuitry may only process data elements which appear at a predetermined data element position within the first and second SIMD operands as received by the SIMD processing unit, and cannot rearrange the data elements or process data elements appearing in the received operands at data element positions corresponding to other parallel processing lanes. By preventing cross-lane switching in the SIMD processing unit, this avoids the performance penalty incurred in previous systems in which some processing time is required for the SIMD processing circuitry to determine which data elements should be processed by each lane.

The data elements of the first and second SIMD operands may have one of a plurality of different data element sizes. The data element size, and number of data elements, used for a given SIMD operation may be selected based on a parameter of the SIMD instruction being executed. For a given data element size, a corresponding configuration of processing lanes may be set up so that each lane performs a parallel operation on one data element from the first SIMD operand and one data element from the second SIMD operand. For example, the SIMD processing circuitry may support processing lanes for handling eight pairs of 8-bit data elements, four pairs of 16-bit data elements, two pairs of 32-bit data elements, or one pair of 64-bit data elements.

The permutation circuitry may be able to perform a plurality of different types of permutation operation. The particular permutation performed may be selected based on a parameter of the first SIMD instruction being executed. For example, different opcodes may be allocated to instructions representing different types of permutation operation, with the type of permutation operation to be performed being determined based on the opcode. Alternatively, instructions with different permutation operations may share the same opcode, with another field of the instruction representing the permutation to be performed.

In general, the permutation operation may receive at least one source operand and generate first and second SIMD operands to be processed by a subsequent SIMD operation. The permutation operation may generate at least one of the first and second SIMD operands with a different data element size and/or data element positioning to the at least one source operand. For some permutation operations, two source operands may be provided and converted into two SIMD operands.

In one example, the permutation circuitry may perform an element rearrangement permutation operation which maps at least some of the source data elements to different data element positions in the first and second SIMD operands. This is especially useful when there are two source operands, since the element rearrangement can change which elements are paired together for the subsequent SIMD operation. A particularly useful example is a pairwise element rearrangement for mapping a pair of neighboring source data elements of the least one source operand to corresponding data element positions in the first and second SIMD operands respectively. Hence, data elements which, if the SIMD operation was applied to the original source operands, would not have been added together because they would be in the same operand, can be rearranged so that they are now added together. A pairwise rearrangement can be useful for determining a sum of a list of data values. Previous SIMD operations may add together portions of the list to produce a SIMD operand having multiple data elements, each data element corresponding to the sum of different portions of the list. By performing a pairwise element rearrangement prior to another SIMD operation, the partial sum values can be placed in corresponding data element positions of the first and second SIMD operands, so that they can be added together. By repeating the pairwise permutation and SIMD addition a number of times, eventually all the data values in the list can be added together.

In another example, the permutation circuitry may perform an element extending permutation operation which generates at least one of the first and second SIMD operands with a larger data element size than at least one source operand.

The element extending operation may be performed in different ways. In one example, each data element in the extended SIMD operand may be generated by setting a first portion of the data element to the data value of a corresponding source data element and filling a second portion of the data element with a sign-extension of the data value of the corresponding source data element (or a zero-extension if unsigned values are used). Typically, the second portion will be more significant than the first portion. In a sign extension, the second portion is filled with bits having the same value as a sign bit of the original data value of the corresponding source data element, while in a zero-extension, the second portion is filled with bits having a value of zero. In this way, a smaller source data element can be inserted into a larger data element of first or second SIMD operand with the remaining portion sign- or zero-extended to preserve its original numeric value.

When performing element extension, it is not essential for all source data elements of the at least one source operand to be mapped to corresponding data elements within one of the SIMD operands. As a result of extending the size of the data elements, there may not be space for all of the source data elements, and so some may need to be discarded. To allow all the original source data elements to be processed, it may be necessary to perform multiple SIMD operations, each SIMD operation operating on extended versions of a subset of data elements from the original source operand.

In one example, the element extending operation may comprise element lengthening in which first and second source operands having M-bit data elements are converted to first and second SIMD operands having N-bit data elements, where N>M. Hence, both the first and second source operands may be extended in a corresponding manner, with the subsequent SIMD operation being performed on the N-bit SIMD operands to produce a result value having N-bit data elements.

Alternatively, an element widening permutation operation may be performed in which one of the source operands has its data elements extended but the other source operand is not extended. For example, this can be useful in order to perform a SIMD operation on source operands having different data element sizes. The widening permutation operation can extend the data elements of the source operand having the smaller data element size, to match the larger data element size of the other source operand, before then performing a SIMD operation on the SIMD operands having corresponding data element sizes.

Also, a permutation operation may perform both an element extension and an element rearrangement, to change both the data element size and the data element positioning when mapping from at least one source operand to the SIMD operands. For example, a pairwise rearrangement-extension operation may operate on a source operand having M-bit data elements to generate first and second SIMD operands having N-bit data elements, with the extended data elements corresponding to neighbouring source data elements of the source operand being placed in corresponding positions of the first and second SIMD operands.

Another type of permutation operation which can be performed by the permutation circuitry is a scalar-by-element permutation operation performed on two source operands to map one data element of the first source operand to each of the data elements of the first SIMD operand and to map respective data elements of the second source operand to corresponding data elements of the second SIMD operand. Hence, the second source operand may be mapped directly to the second SIMD operand, while the same data element of the first source operand may be duplicated in each of the lanes of the first SIMD operand. This allows the subsequent SIMD operation to pair the duplicated data element of the first source operand with each of the data elements of the second source operand. For example, this can be used to combine each element of a vector quantity with a scalar value. If desired, the scalar-by-element permutation operation may also include extending the data element size by lengthening or widening as discussed above.

The data values represented by each data element may be integer values or floating point values.

The SIMD operation comprises each of the parallel processing lanes performing a processing operation on a data element of the first SIMD operand and a corresponding data element of the second SIMD operand. The processing operation may comprise many different kinds of operation. For example, the processing operation may comprise adding or subtracting the corresponding data elements, determining a minimum or maximum value of the corresponding pair of data elements, determining an absolute difference between the data elements, or determining an absolute difference between the data elements followed by adding the absolute difference to a value stored in a storage location (absolute difference with accumulate). Each of these processing operations may correspond to different instructions within an instruction set, with each instruction having different versions, some of which require permutation and some of which do not require permutation. The versions requiring permutation can be handled using both the permutation circuitry and the SIMD processing circuitry, while the versions not requiring permutation can be processed faster using the SIMD processing circuitry. It will be appreciated that many other kinds of processing operation could be performed by the SIMD processing circuitry.

The permutation circuitry may provide the generated first and second SIMD operands directly to the SIMD processing circuitry. Alternatively, the permutation circuitry may write the generated first and second SIMD operands to a data store, such as a register bank, and the SIMD processing unit can then read the generated SIMD operands from the data store. The first and second SIMD instructions may specify the respective source operands or SIMD operands using register identifiers of registers of the register bank.

Viewed from another aspect, the present invention provides a data processing apparatus comprising:

single instruction multiple data (SIMD) processing means for performing a SIMD operation on first and second SIMD operands comprising a plurality of data elements, the SIMD processing means having a plurality of parallel processing lane means for processing corresponding data elements of the first and second SIMD operands;

permutation means for performing a permutation operation on at least one source operand comprising a plurality of source data elements to generate said first and second SIMD operands, said permutation operation generating at least one of said first and second SIMD operands with at least one of a different data element size and a different data element positioning to said at least one source operand; and instruction decoding means for decoding SIMD instructions requiring the SIMD operation to be performed by the SIMD processing means;

wherein in response to a first SIMD instruction requiring the permutation operation and identifying the at least one source operand, the instruction decoding means is configured to control the permutation means to perform the permutation operation on the at least one source operand to generate the first and second SIMD operands, and to control the SIMD processing means to perform the SIMD operation using the first and second SIMD operands generated by the permutation means; and in response to a second SIMD instruction not requiring the permutation operation and identifying the first and second SIMD operands, the instruction decoding means is configured to control the SIMD processing means to perform the SIMD operation using the first and second SIMD operands identified by the second SIMD instruction, without passing the first and second SIMD operands via the permutation means.

Viewed from a further aspect, the present invention provides a method of processing data comprising:

decoding single instruction multiple data (SIMD) instructions requiring a SIMD operation to be performed by SIMD processing circuitry on first and second SIMD operands comprising a plurality of data elements, the SIMD processing circuitry having a plurality of parallel processing lanes for processing corresponding data elements of the first and second SIMD operands;

in response to decoding a first SIMD instruction requiring a permutation operation and identifying at least one source operand comprising a plurality of source data elements, controlling permutation circuitry to perform the permutation operation on the at least one source operand to generate said first and second SIMD operands with at least one of a different data element size and a different data element positioning to said at least one source operand, and controlling the SIMD processing circuitry to perform the SIMD operation using the first and second SIMD operands generated by the permutation circuitry; and in response to decoding a second SIMD instruction not requiring the permutation operation and identifying the first and second SIMD operands, controlling the SIMD processing circuitry to perform the SIMD operation using the first and second SIMD operands identified by the second SIMD instruction, without passing the first and second SIMD operands via the permutation circuitry.

Viewed from another aspect, the present invention provides a data processing apparatus comprising:

permutation circuitry configured to perform, in response to a program instruction, a permutation operation on at least one source operand comprising a plurality of source data elements to generate at least one permuted operand comprising a plurality of permuted data elements, said permutation operation generating each of the plurality of permuted data elements of said at least one permuted operand by:
(i) setting a first portion of the permuted data element to a data value of a corresponding source data element; and
(ii) filling a second portion of the permuted data element with a sign-extension or zero-extension of said data value of said corresponding source data element;
wherein for at least one permuted data element, the data element position within said at least one permuted operand is different to the data element position of the corresponding source data element within said at least one source operand.

As discussed above, the permutation circuitry may provide at least one permutation operation which provides both a rearrangement of at least some data elements and a sign- or zero-extension of the source data elements to produce permuted data elements having a larger data element size. This avoids the need for separate instructions for performing these operations and hence speeds up the permutation and any corresponding SIMD operation.

Viewed from a further aspect, the present invention provides a data processing apparatus comprising:

permutation means for performing, in response to a program instruction, a permutation operation on at least one source operand comprising a plurality of source data elements to generate at least one permuted operand comprising a plurality of permuted data elements, said permutation operation generating each of the plurality of permuted data elements of said at least one permuted operand by:
(i) setting a first portion of the permuted data element to a data value of a corresponding source data element; and
(ii) filling a second portion of the permuted data element with a sign-extension or zero-extension of said data value of said corresponding source data element;
wherein for at least one permuted data element, the data element position within said at least one permuted operand is different to the data element position of the corresponding source data element within said at least one source operand.

Viewed from another aspect, the present invention provides a method of processing data comprising:

in response to a program instruction, performing a permutation operation on at least one source operand comprising a plurality of source data elements to generate at least one permuted operand comprising a plurality of permuted data elements, said permutation operation generating each of the plurality of permuted data elements of said at least one permuted operand by:
(i) setting a first portion of the permuted data element to a data value of a corresponding source data element; and
(ii) filling a second portion of the permuted data element with a sign-extension or zero-extension of said data value of said corresponding source data element;
wherein for at least one permuted data element, the data element position within said at least one permuted operand is different to the data element position of the corresponding source data element within said at least one source operand.

The method of processing data may be performed using a computer or other data processing apparatus having permutation circuitry for performing the permutation operation.

The above, and other objects, features and advantages of this invention will be apparent from the following detailed description of illustrative embodiments which is to be read in connection with the accompanying drawings.

BRIEF DESCRIPTION OF THE DRAWINGS

FIG. 9 illustrates a timing diagram showing an example of the number of cycles required for executing a permutation instruction and first and second SIMD instructions.

DESCRIPTION OF EXAMPLE EMBODIMENTS

Figure 1:
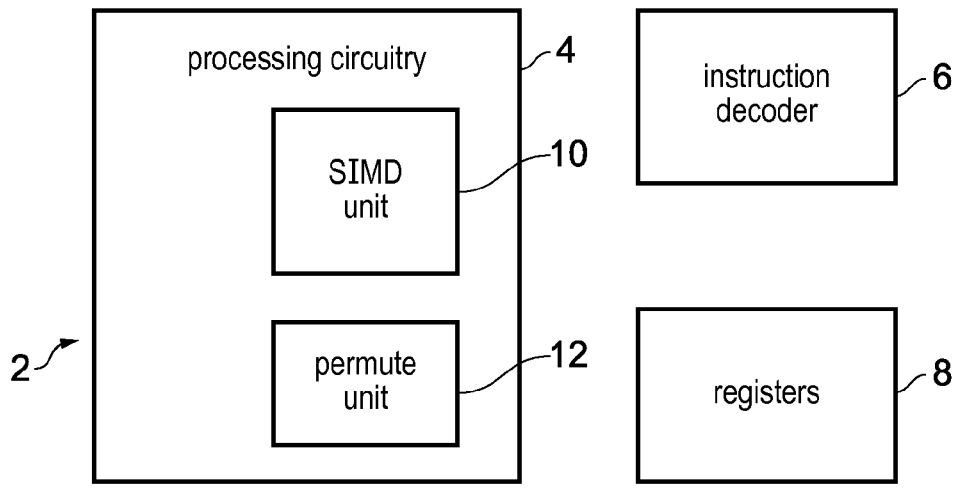
FIG. 1 schematically illustrates a portion of a data processing apparatus.

FIG. 1 schematically illustrates a portion of a data processing apparatus 2 comprising processing circuitry 4, an instruction decoder 6 and registers 8. It will be appreciated that the processing apparatus 2 may also have other elements not illustrated in FIG. 1 for conciseness. The instruction decoder 6 decodes instructions to be performed by the processing circuitry 4. Results of instructions may be placed in the registers 8 where they can be read by the processing circuitry 4 when executing other instructions. The instruction decoder 6 may split some instructions into micro operations to be performed by different units of the processing circuitry 4. Micro-operations can be scheduled separately by the processing circuitry 4. The processing circuitry 4 comprises a single instruction multiple data (SIMD) processing unit 10 and a permutation unit 12 which can perform separate micro-operations in response to a single SIMD instruction. Alternatively, a separate permutation instruction can be executed by the permutation unit 12 and a separate SIMD instruction can be executed by the SIMD processing unit 10.

Figure 2:
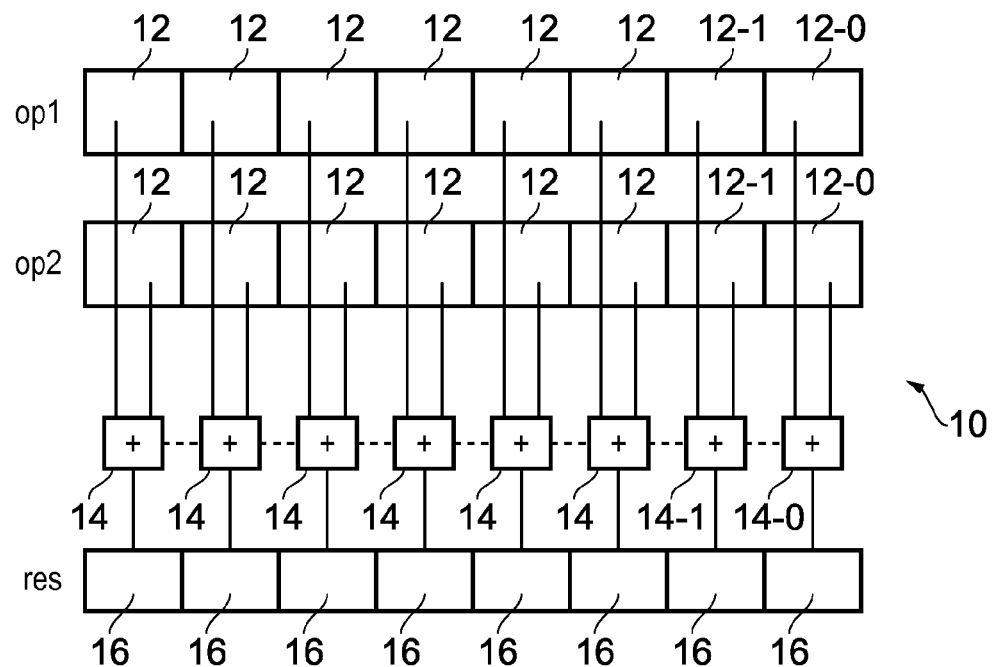
FIG. 2 illustrates a SIMD processing unit having parallel processing lanes for performing operations in parallel on respective data elements of first and second SIMD operands.

FIG. 2 shows an example of the SIMD processing unit 10. The SIMD processing unit 10 has several lanes of parallel processing which process respective pairs of data elements 12 of SIMD operands op1, op2 in parallel with each other. In this example, the parallel processing lanes are represented by adders 14 which each add one data element 12 from the first SIMD operand op1 and one data element 12 of the second operand op2 and place the sum in a result data element 16 of a result value res. The result value can be written back to registers 8. Each lane of processing 14 can only process the data elements 12 that are at a predetermined data element position within the input operands op1, op2. For example, the right hand adder 14-0 can only process the right-most elements 12-0 of the respective operands, the second adder 14-1 from the right processes the second right-most data elements 12-1, and so on. A lane of processing 14 cannot process data elements from other lanes. Since there are no cross-lane operations in the SIMD unit 10, lanes of processing 14 do not need to take time to determine which data elements they should process, and so SIMD processing by the SIMD unit 10 can be performed quickly. Each of the parallel operations can be completed within a single cycle.

FIG. 2 shows an example where the two SIMD operands op1, op2 have eight data elements and the result value also has eight data elements. However, the SIMD unit 10 may be configurable to process data values with different data element sizes. For example, if the operands op1, op2 shown in FIG. 2 are 64-bit values, FIG. 2 shows an example where eight pairs of 8-bit data elements are processed by the respective adders 14. In another configuration, the adders 14 can be paired in twos to provide four lanes of processing, each lane processing an addition of a pair of 16-bit data elements. Similarly, the SIMD unit 10 may be configured to provide two parallel lanes of processing each processing a pair of 32-bit operands, or one lane processing a pair 64-bit data elements. The data element size used for a given SIMD operation may be selected based on a parameter of the instruction decoded by the instruction decoder 6. While FIG. 2 shows an example in which the SIMD operation performed in each lane of processing is an addition, each lane could also process other kinds of processing operation.

Figure 3:
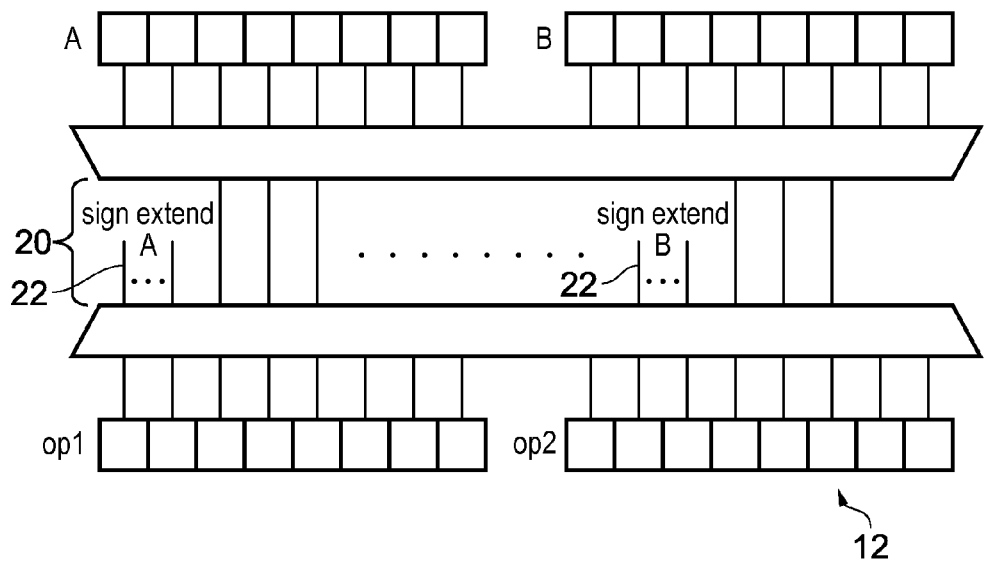
FIG. 3 illustrates an example of permutation circuitry for performing a permutation operation on at least one source operand to generate first and second SIMD operands.

An example of the permutation unit 12 is shown in FIG. 3. The permutation unit 12 is for performing a permutation operation to change the arrangement of data elements. The permutation unit 12 receives one or more source operand A, B including a number of data elements and comprises multiplexing circuitry 20 which maps at least some of the data elements to corresponding portions of the SIMD operands op1, op2 to be processed by the SIMD unit 10. The multiplexing circuitry 20 can map any data element of the input operands A, B to any portion of a data element of the SIMD operands op1, op2. The control of the multiplexer is performed based on the instruction decoded by the instruction decoder 6. For example, the multiplexing circuitry 20 may have a number of predetermined wire configurations connecting different portions of the input operands A, B to portions of the SIMD operands op1, op2. A particular configuration can be selected based on a parameter of the decoded instruction.

While FIG. 3 shows two input operands A, B, for some permutation operations both the SIMD operands op1, op2 may be determined based on data elements of a single source operand A, with the B input to the multiplexing circuitry 20 being ignored. Also, the number of data elements and the size of the data elements need not be the same between the source operands and SIMD operands. As shown in FIG. 3, the multiplexing circuitry 20 may input sign extending bits 22 corresponding to the respective source data elements and place the sign bits in portions of the SIMD operands op1, op2. For a signed value, the sign extension bits 22 are equal to the sign bit of the corresponding source data element (0 for positive values and 1 for negative values). On the other hand, if the data values of the source operands A, B are unsigned, then the sign bits can be 0 for all data elements. The sign extension bits 22 (or zero extension bits for unsigned values) are used for lengthening or widening data elements so that the data element size can be extended while maintaining the correct numeric value for that data element.

Figure 4A:
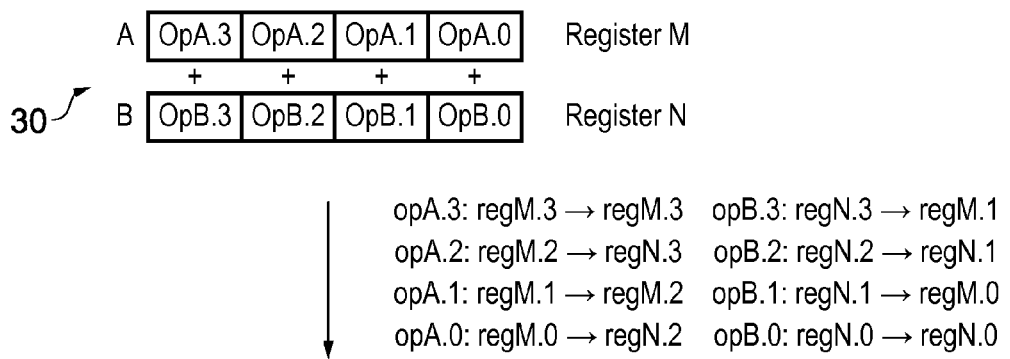
FIGS. 4A to 4C illustrates an example of pairwise element rearrangement.
Figure 4A:
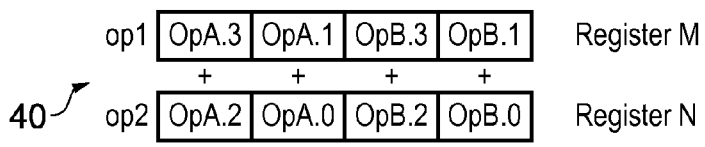

FIG. 4A shows an example of a pairwise element rearrangement permutation operation that may be performed by the permutation unit 12. As shown in portion 30 of FIG. 4A, originally some registers M, N store two source operands A, B each having four 16-bit data elements. A SIMD operation can be performed on these operands in their current form by using the SIMD unit 10 alone without the permutation unit 12 performing any permutation. In this case, element 0 of operand A would be added to element 0 of operand B, element 1 of operand A would be added to element 1 of the operand B, and so on, as shown in portion 30 of FIG. 4A.

Figure 4B:
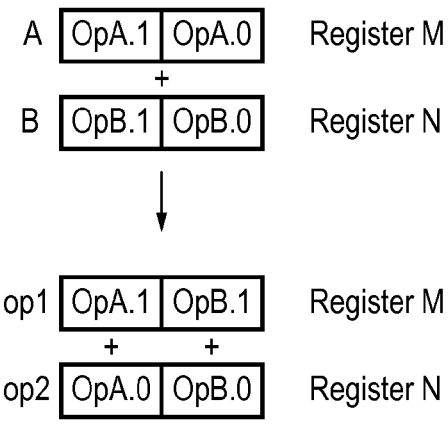
Figure 4C:
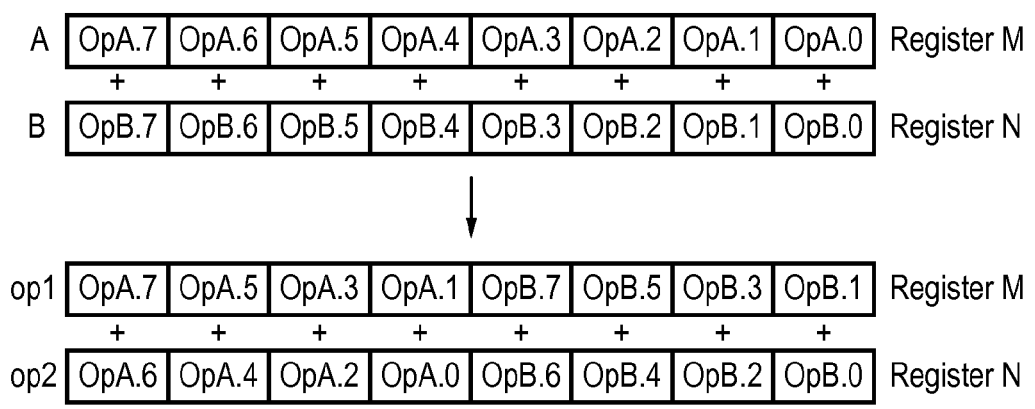

However, it may be desired to add elements 3 and 2 of operand A together, and perform similar pairwise additions of neighbouring elements in the remainder of operands A and B. This is shown in portion 40 at the bottom of FIG. 4A. To achieve this, an element rearrangement is performed by the permutation unit 12 to transfer the values between registers using the sequence of transfers shown in FIG. 4A. That is, the multiplexing circuitry 20 maps data elements of the source operands A, B to different data element positions within the SIMD operands op1, op2 so that the SIMD unit 10 can perform a SIMD operation to add different combinations of elements together. Similarly, a pairwise permutation may be provided for types of SIMD operation other than a SIMD addition. FIGS. 4B and 4C show similar pairwise rearrangements performed for operands having two and eight data elements respectively. In the pairwise rearrangement shown in FIGS. 4A to 4C, the number of data elements and the size of data elements remains the same during the permutation.

Figure 5A:
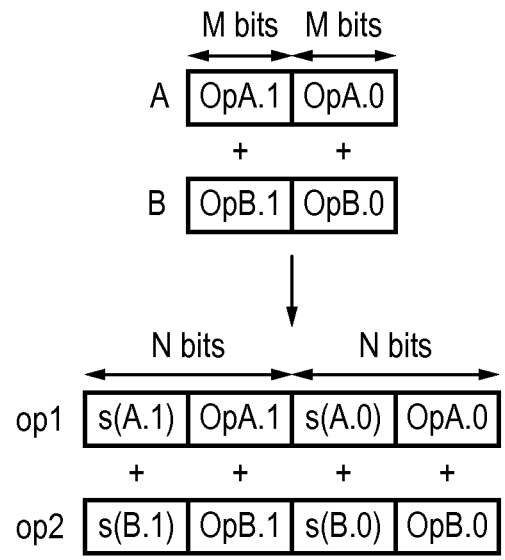
FIGS. 5A and 5B illustrate examples of permutation operations for lengthening data elements.
Figure 5B:
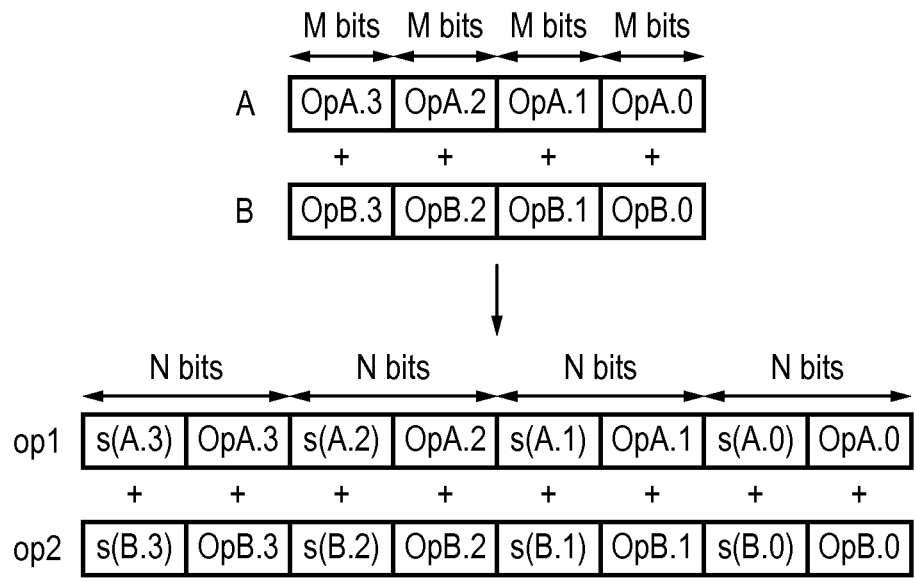

FIGS. 5A and 5B show an example of a lengthening permutation operation in which the data element size changes during the permutation. The permutation unit 12 extends the size of each data element within source operands A, B to produce larger SIMD operands op1, op2. In this example, each M-bit data element of the first and second source operands A, B is sign extended and mapped to a corresponding position of the first and second SIMD operands op1, op2 to form an N-bit data element (N>M). The sign extension extends the original data value with bits having the same value as the most significant bit of the data value. If the original data value was unsigned then it would be zero-extended instead of sign-extended. Hence, the permutation unit 12 can generate SIMD operands with larger data elements than the source operands. FIGS. 5A and 5B show examples of enlarging operands having two and four data elements respectively.

Figure 6A:
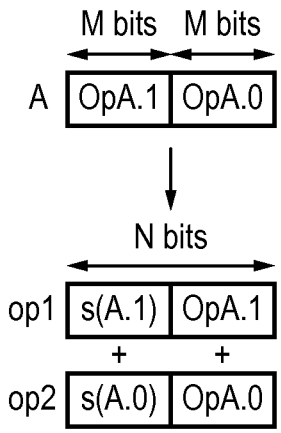
FIG. 6A to 6C show examples of permutations for pairwise-lengthening of data elements.
Figure 6B:
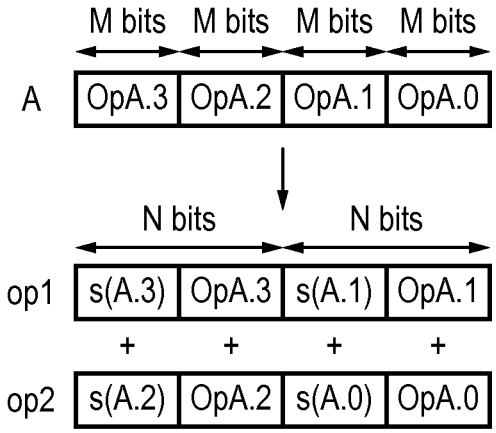
Figure 6C:
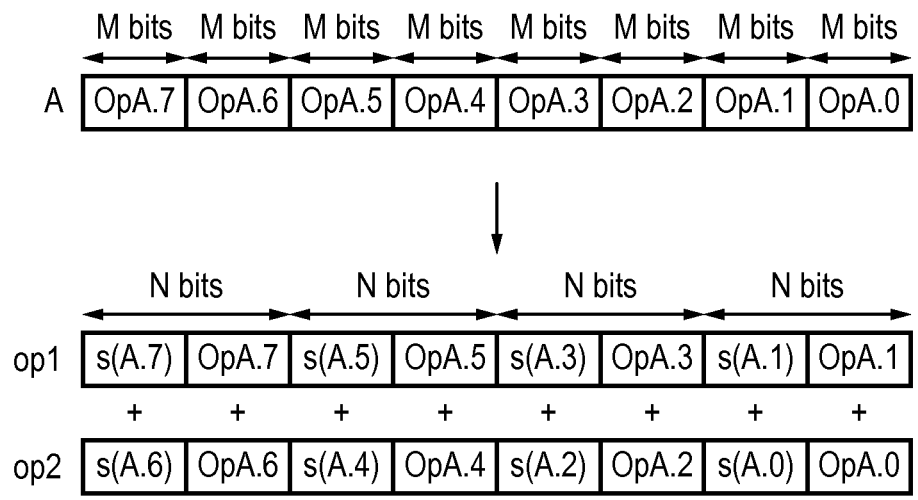

FIGS. 6A to 6C show another example of a permutation operation 4 performing a pairwise-lengthening addition. In this case, a single source operand A is provided, and the positions of the respective data elements of the source operand are rearranged in the SIMD operands op1, op2 as well as being sign extended from M bits to N bits (N>M). The pairwise rearrangement places neighbouring M-bit elements of the source operands at corresponding positions within the two SIMD operands. For example, source data elements OpA.1 and OpA.0 of operand A are now at corresponding positions in the same lane of the two SIMD operands op1, op2. Again, zero-extension could be used instead of sign-extension for unsigned values. FIGS. 6A, 6B and 6C show the pairwise-lengthening for two, four and eight element operands respectively.

Figure 7A:
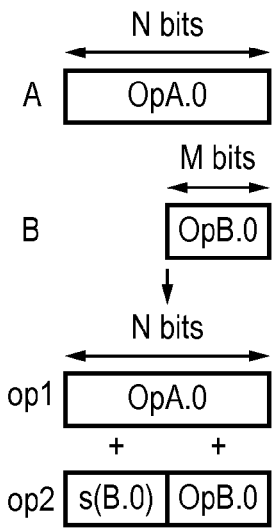
FIGS. 7A to 7C illustrate examples of permutations for widening one source's operands to correspond to a data element size of another source's operand.
Figure 7B:
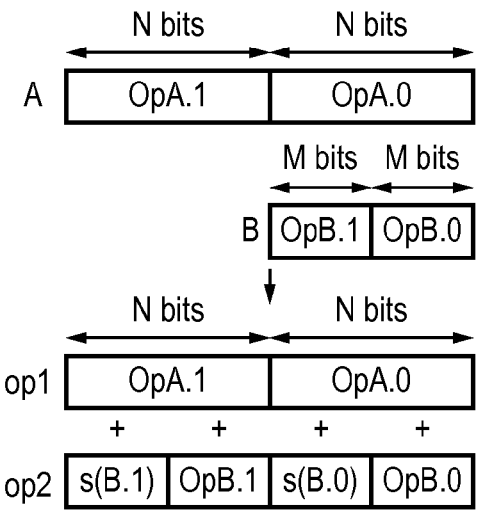
Figure 7C:
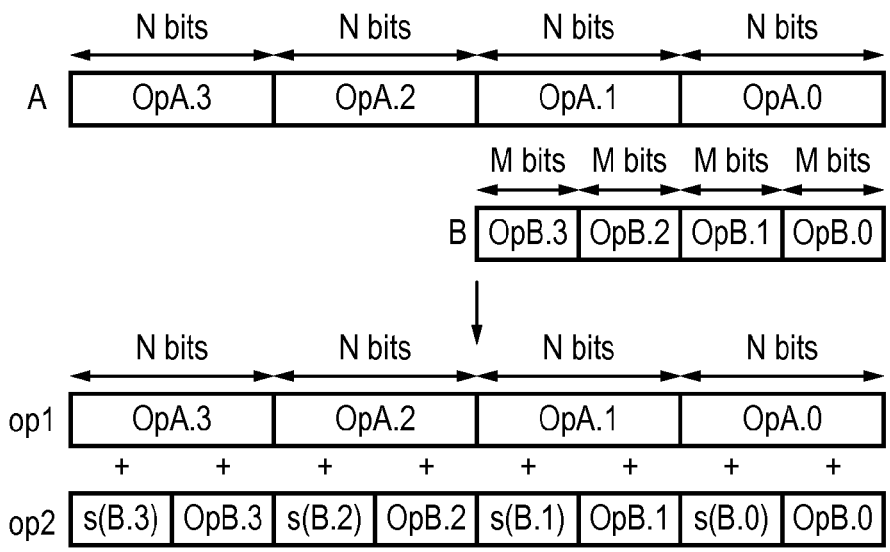

FIGS. 7A to 7C show another example of a permutation for widening data elements of one of a pair of source operands to match the size of the data elements of the other source operand. In this case source operand A is mapped directly to SIMD operand op1, while source operand B has each M-bit data element sign-extended (or zero-extended) and placed in a corresponding location within the second SIMD operand op2. This type of permutation allows operands A and B to be combined using a single SIMD instruction despite having different data element sizes. Each SIMD processing lane then combines a corresponding pair of data elements of the first and second SIMD operands op1, op2. FIGS. 7A-7C show an example where this permutation is applied to source operands having one, two or four data elements respectively.

Figure 8:
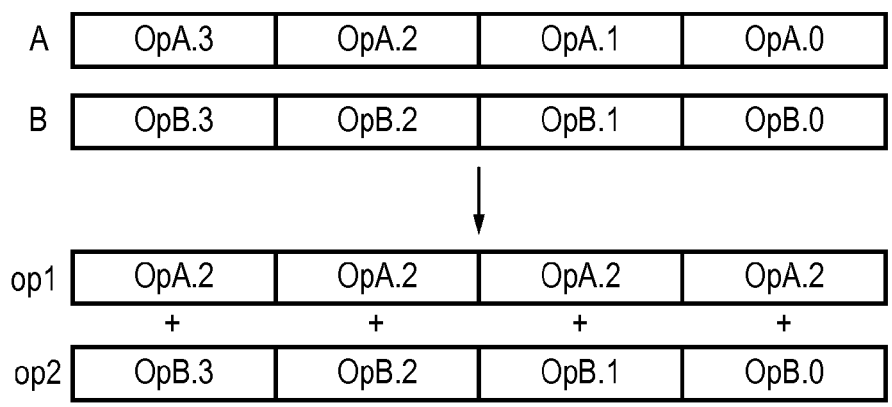
FIG. 8 illustrates an example of a scalar-by-element permutation for mapping one selected data element of a first source operand to each of the data elements of a first SIMD operand.

FIG. 8 shows another example of a permutation operation. In this case, source operand B is mapped directly to the second SIMD operand op2. On the other hand, one element (OpA.2 in this example) of source operand A is selected and replicated in each of the lanes of the first SIMD operand op1. By copying the same source data element into multiple lanes of the SIMD operand, a subsequent scalar-by-element vector SIMD operation can combine each element of the vector represented by op2 with a scalar quantity represented by the duplicated element OpA.2 of op1.

While FIGS. 2 and 4A-8 show examples where the SIMD operation performed in each processing lane is an addition of corresponding data elements of the operands op1, op2, other kinds of processing operation could also be performed. For example, the present technique can be applied to any of the following kinds of signed or unsigned SIMD instruction:

ADD: each processing lane adds two corresponding data elements, with optional permutations including pairwise, lengthening, widening, and pairwise-lengthening;

SUB: each processing lane subtracts two corresponding data elements, with optional permutations including lengthening and widening;

MIN: each processing lane determines the minimum value of two corresponding data elements, with optional pairwise permutation;

MAX: each processing lane determines the maximum value of two corresponding data elements, with optional pairwise permutation;

ABD: each processing lane determines the absolute difference of two corresponding data elements, with optional lengthening permutation;

ABA: each processing lane determines the absolute difference of two corresponding data elements and then accumulates the absolute difference into a register, with optional lengthening permutation.

Also, scalar-by-element permutation could also be applied to all of these instructions. Many other types of processing operation and permutation could also be performed.

FIG. 9 shows a timing diagram showing processing cycles for performing different instructions. As shown in FIG. 9, a first type of SIMD instruction 50 which requires a permutation operation is performed in two cycles, one cycle to perform the permutation and one cycle to perform the SIMD operation on the operands op1, op2 generated using the permutation.

Also, FIG. 9 shows a second type of SIMD instruction 52 for which no permutation is required. This instruction is processed by the SIMD unit 10, which performs the SIMD operation directly on the operands op1, op2 specified by the instruction 52, without passing these operands via the permutation unit 12. This is in contrast to previous implementations which would have passed the operands through a permutation stage even if the SIMD instruction does not require a permutation. Therefore, the present technique saves a processing cycle and so the SIMD instruction 52 can now be performed in one processing cycle. In practice, most SIMD instructions are of the second type 52, and instructions 50 requiring a permutation are rare. Therefore, the additional processing cycle required by a permutation can be avoided for most SIMD instructions, providing a significant performance saving.

FIG. 9 also shows a separate permute instruction 54 that only requires a permutation operation to be performed, without a subsequent SIMD operation. This instruction 54 can be performed in a single cycle using the permutation unit 12.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   single instruction multiple data (SIMD) processing circuitry configured to perform a SIMD operation on first and second SIMD operands comprising a plurality of data elements, the SIMD processing circuitry having a plurality of parallel processing lanes for processing corresponding data elements of the first and second SIMD operands;
   permutation circuitry configured to perform a permutation operation on at least one source operand comprising a plurality of source data elements to generate said first and second SIMD operands, said permutation operation generating at least one of said first and second SIMD operands with at least one of a different data element size and a different data element positioning to said at least one source operand; and
   an instruction decoder configured to decode SIMD instructions requiring the SIMD operation to be performed by the SIMD processing circuitry;
   wherein in response to a first SIMD instruction requiring the permutation operation and identifying the at least one source operand, the instruction decoder is configured to control the permutation circuitry to perform the permutation operation on the at least one source operand to generate the first and second SIMD operands, and to control the SIMD processing circuitry to perform the SIMD operation using the first and second SIMD operands generated by the permutation circuitry; and
   in response to a second SIMD instruction not requiring the permutation operation and identifying the first and second SIMD operands, the instruction decoder is configured to control the SIMD processing circuitry to perform the SIMD operation using the first and second SIMD operands identified by the second SIMD instruction, without passing the first and second SIMD operands via the permutation circuitry.

2. The data processing apparatus according to claim 1, wherein the processing apparatus is configured to process the second SIMD instruction in fewer processing cycles than the first SIMD instruction.

3. The data processing apparatus according to claim 1, wherein the SIMD processing circuitry does not support said permutation operation.

4. The data processing apparatus according to claim 1, wherein each parallel processing lane can only process data elements appearing at a predetermined data element position within the first and second SIMD operands as received by said SIMD processing circuitry, and cannot process data elements appearing in the received first and second SIMD operands at other data element positions.

5. The data processing apparatus according to claim 1, wherein said data elements of said first and second SIMD operands have one of a plurality of different data element sizes.

6. The data processing apparatus according to claim 1, wherein said permutation circuitry is configured to perform a plurality of different types of said permutation operation.

7. The data processing apparatus according to claim 1, wherein for at least one type of permutation operation, said permutation circuitry is configured to perform said permutation operation on first and second source operands each comprising a plurality of source data elements to generate said first and second SIMD operands.

8. The data processing apparatus according to claim 1, wherein said permutation circuitry is configured to perform an element rearrangement permutation operation to map at least some of said plurality of source data elements to different data element positions in said first and second SIMD operands.

9. The data processing apparatus according to claim 8, wherein said element rearrangement permutation operation comprises a pairwise element rearrangement operation for mapping a pair of neighbouring source data elements of said at least one source operand to corresponding data element positions in said first and second SIMD operands respectively.

10. The data processing apparatus according to claim 1, wherein said permutation circuitry is configured to perform an element extending permutation operation to generate at least one of said first and second SIMD operands with a larger data element size than one of said at least one source operand.

11. The data processing apparatus according to claim 10, wherein when performing said element extending permutation operation, said permutation circuitry is configured to generate each data element of said at least one of said first and second SIMD operands by:
  (i) setting a first portion of the data element to a data value of a corresponding source data element; and
  (ii) filling a second portion of the data element with a sign-extension or zero-extension of said data value of said corresponding source data element.

12. The data processing apparatus according to claim 10, wherein said element extending permutation operation comprises an element lengthening permutation operation performed on first and second source operands each having M-bit source data elements to generate first and second SIMD operands each having N-bit data elements, where M and N are integers and N>M.

13. The data processing apparatus according to claim 10, wherein said element extending permutation operation comprises an element widening permutation operation performed on a first source operand having N-bit source data elements and a second source operand having M-bit source data elements to generate first and second SIMD operands each having N-bit data elements, where M and N are integers and N>M.

14. The data processing apparatus according to claim 10, wherein said element extending permutation operation comprises an element extending-and-rearranging permutation operation performed on at least one source operand having M-bit source data elements to map at least some of said source data elements to different data element positions in said first and second SIMD operands, said first and second SIMD operands having N-bit data elements, where M and N are integers and N>M.

15. The data processing apparatus according to claim 1, wherein said permutation circuitry is configured to perform a scalar-by-element permutation operation on first and second source operands to generate said first and second SIMD operands,
  said scalar-by-element permutation operation comprising mapping a selected source data element of said first source operand to each of the data elements of said first SIMD operand, and mapping respective data elements of said second source operand to corresponding data elements of said second SIMD operand.

16. The data processing apparatus according to claim 1, wherein said SIMD operation comprises each of the parallel processing lanes performing a processing operation on said corresponding data elements of said first and second SIMD operands, said processing operation comprising one of:
  adding said corresponding data elements;
  subtracting one of said corresponding data elements from the other of said corresponding data elements;
  determining a minimum value of said corresponding data elements;
  determining a maximum value of said corresponding data elements;
  determining an absolute difference between the corresponding data elements; and
  determining an absolute difference between the corresponding data elements and adding said absolute difference to a value stored in a storage location.

17. The data processing apparatus according to claim 1, wherein said permutation circuitry is configured to write the generated first and second SIMD operands to a data store.

18. The data processing apparatus according to claim 1, wherein in response to a permutation instruction specifying said at least one source operand and not requiring said SIMD processing circuitry to perform said SIMD operation, said instruction decoder is configured to control said permutation circuitry to perform said permutation operation.

19. A data processing apparatus comprising:
  single instruction multiple data (SIMD) processing means for performing a SIMD operation on first and second SIMD operands comprising a plurality of data elements, the SIMD processing means having a plurality of parallel processing lane means for processing corresponding data elements of the first and second SIMD operands;
  permutation means for performing a permutation operation on at least one source operand comprising a plurality of source data elements to generate said first and second SIMD operands, said permutation operation generating at least one of said first and second SIMD operands with at least one of a different data element size and a different data element positioning to said at least one source operand; and
  instruction decoding means for decoding SIMD instructions requiring the SIMD operation to be performed by the SIMD processing means;
  wherein in response to a first SIMD instruction requiring the permutation operation and identifying the at least one source operand, the instruction decoding means is configured to control the permutation means to perform the permutation operation on the at least one source operand to generate the first and second SIMD operands, and to control the SIMD processing means to perform the SIMD operation using the first and second SIMD operands generated by the permutation means; and in response to a second SIMD instruction not requiring the permutation operation and identifying the first and second SIMD operands, the instruction decoding means is configured to control the SIMD processing means to perform the SIMD operation using the first and second SIMD operands identified by the second SIMD instruction, without passing the first and second SIMD operands via the permutation means.

20. A method of processing data comprising:

decoding single instruction multiple data (SIMD) instructions requiring a SIMD operation to be performed by SIMD processing circuitry on first and second SIMD operands comprising a plurality of data elements, the SIMD processing circuitry having a plurality of parallel processing lanes for processing corresponding data elements of the first and second SIMD operands;

in response to decoding a first SIMD instruction requiring a permutation operation and identifying at least one source operand comprising a plurality of source data elements, controlling permutation circuitry to perform the permutation operation on the at least one source operand to generate said first and second SIMD operands with at least one of a different data element size and a different data element positioning to said at least one source operand, and controlling the SIMD processing circuitry to perform the SIMD operation using the first and second SIMD operands generated by the permutation circuitry; and in response to decoding a second SIMD instruction not requiring the permutation operation and identifying the first and second SIMD operands, controlling the SIMD processing circuitry to perform the SIMD operation using the first and second SIMD operands identified by the second SIMD instruction, without passing the first and second SIMD operands via the permutation circuitry.

21. A data processing apparatus comprising:

permutation circuitry configured to perform, in response to a program instruction, a permutation operation on at least one source operand comprising a plurality of source data elements to generate at least one permuted operand comprising a plurality of permuted data elements, said permutation operation generating each of the plurality of permuted data elements of said at least one permuted operand by:

(i) setting a first portion of the permuted data element to a data value of a corresponding source data element; and
(ii) filling a second portion of the permuted data element with a sign-extension or zero-extension of said data value of said corresponding source data element;

wherein for at least one permuted data element, the data element position within said at least one permuted operand is different to the data element position of the corresponding source data element within said at least one source operand.

22. A data processing apparatus comprising:

permutation means for performing, in response to a program instruction, a permutation operation on at least one source operand comprising a plurality of source data elements to generate at least one permuted operand comprising a plurality of permuted data elements, said permutation operation generating each of the plurality of permuted data elements of said at least one permuted operand by:

(i) setting a first portion of the permuted data element to a data value of a corresponding source data element; and
(ii) filling a second portion of the permuted data element with a sign-extension or zero-extension of said data value of said corresponding source data element;

wherein for at least one permuted data element, the data element position within said at least one permuted operand is different to the data element position of the corresponding source data element within said at least one source operand.

23. A method of processing data comprising:

in response to a program instruction, performing a permutation operation on at least one source operand comprising a plurality of source data elements to generate at least one permuted operand comprising a plurality of permuted data elements, said permutation operation generating each of the plurality of permuted data elements of said at least one permuted operand by:

(i) setting a first portion of the permuted data element to a data value of a corresponding source data element; and
(ii) filling a second portion of the permuted data element with a sign-extension or zero-extension of said data value of said corresponding source data element;

wherein for at least one permuted data element, the data element position within said at least one permuted operand is different to the data element position of the corresponding source data element within said at least one source operand.

* * * * *